May 6, 1924.
H. R. POLLEYS ET AL
1,492,745
MACHINE FOR APPLYING FLUENT MATERIAL
Filed Jan. 31, 1921   5 Sheets-Sheet 1
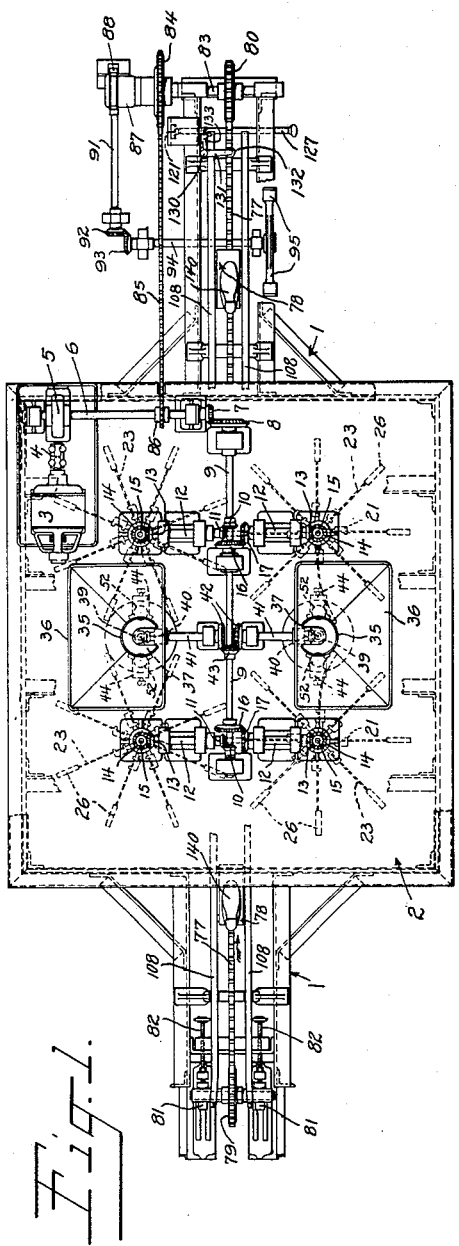
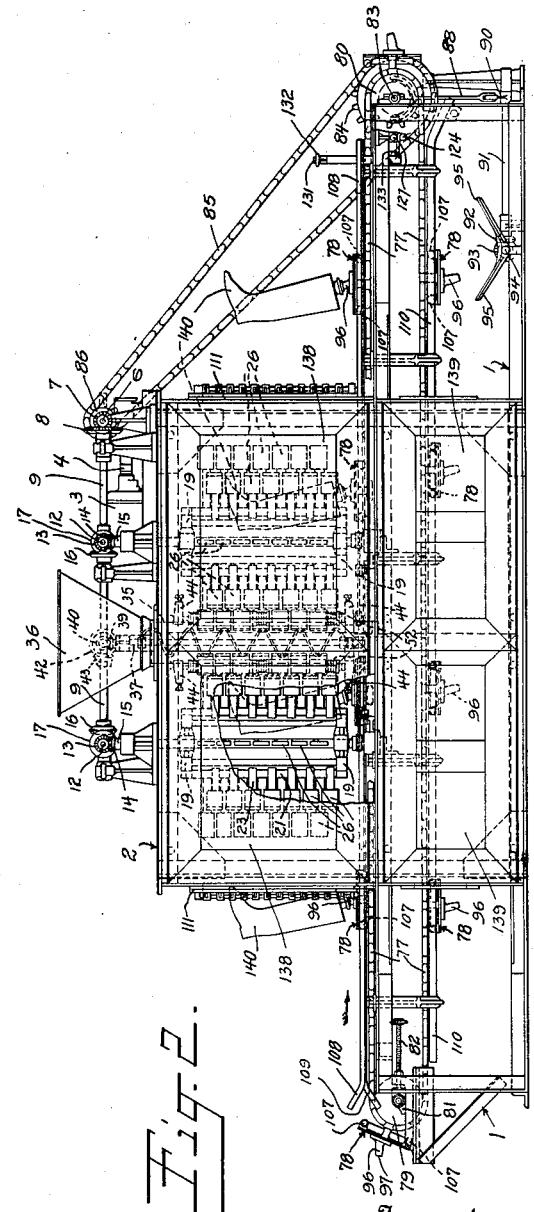
Inventors
Herbert R. Polleys
and Chester J. Randall
By their Attorney
Ernest Hopkinson May 6, 1924.
H. R. POLLEYS ET AL
MACHINE FOR APPLYING FLUENT MATERIAL
Filed Jan. 31, 1921   5 Sheets-Sheet 2
1,492,745
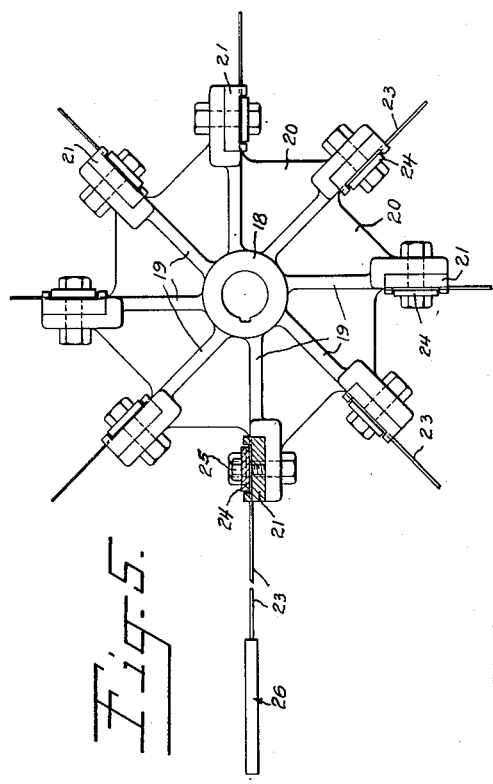
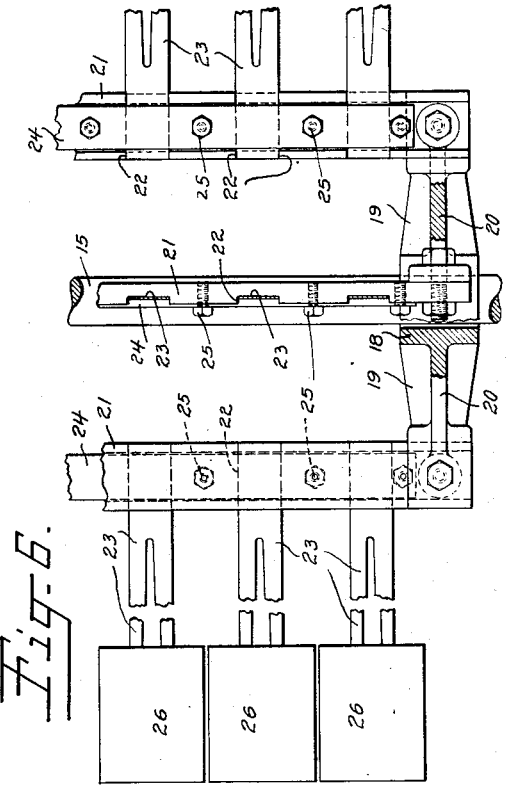
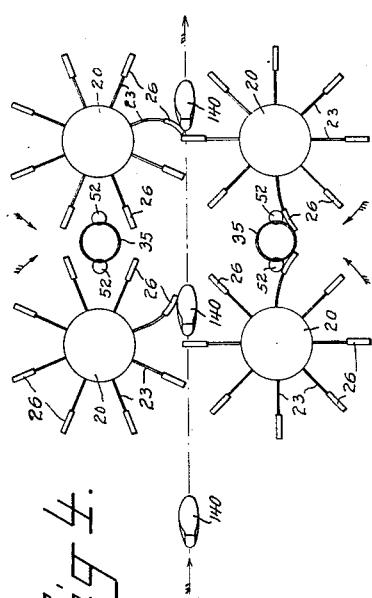
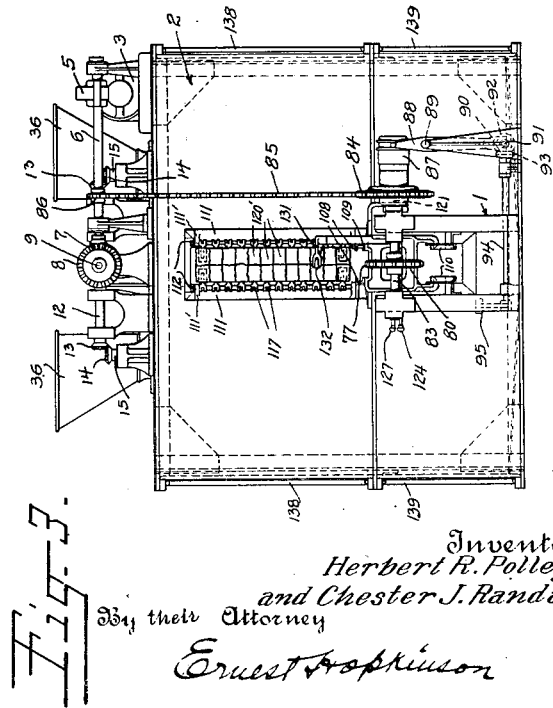
Inventors
Herbert R. Polleys
and Chester J. Randall
By their Attorney
Ernest Hopkinson

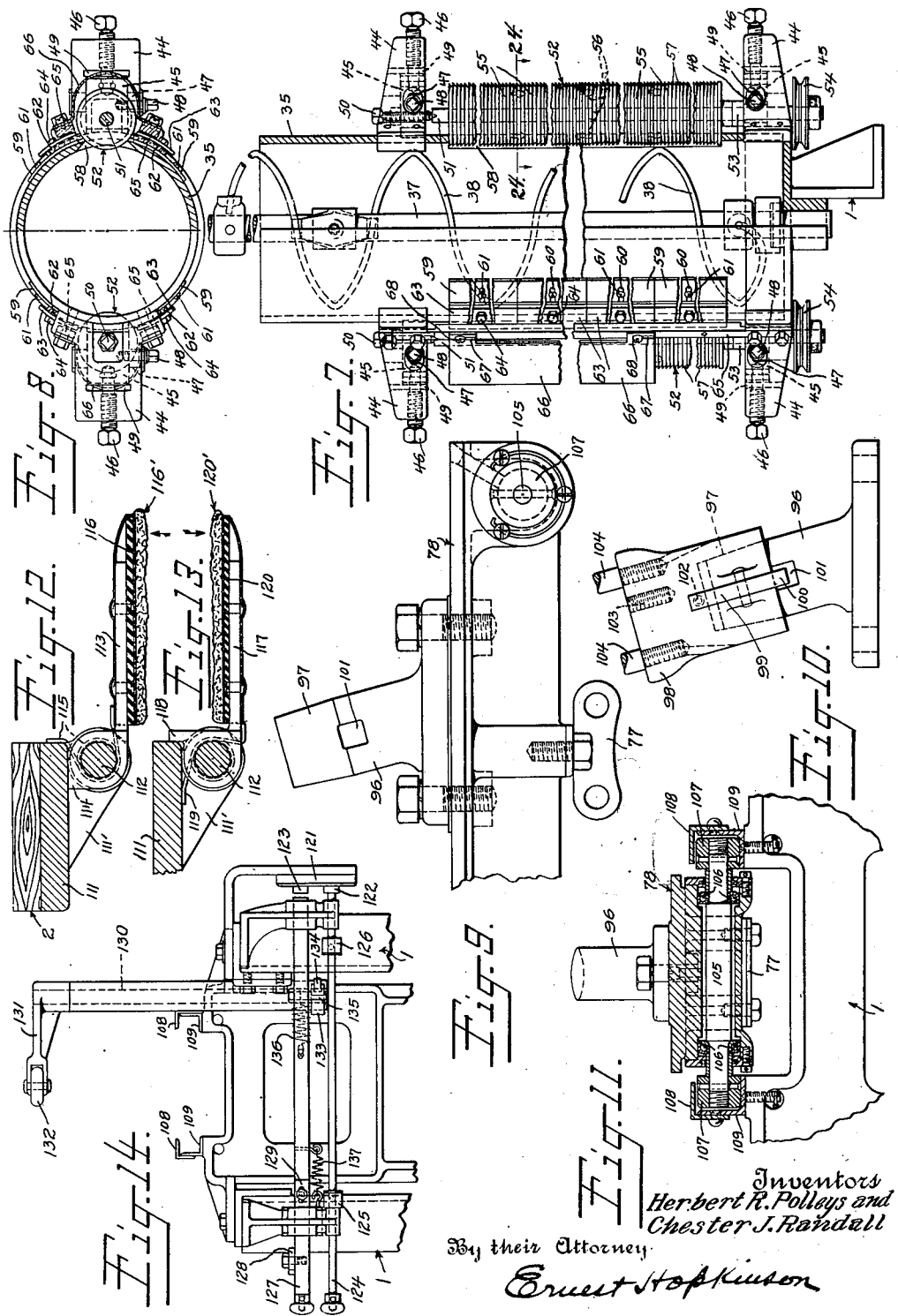

May 6, 1924.
H. R. POLLEYS ET AL
1,492,745
MACHINE FOR APPLYING FLUENT MATERIAL
Filed Jan. 31, 1921     5 Sheets-Sheet 4
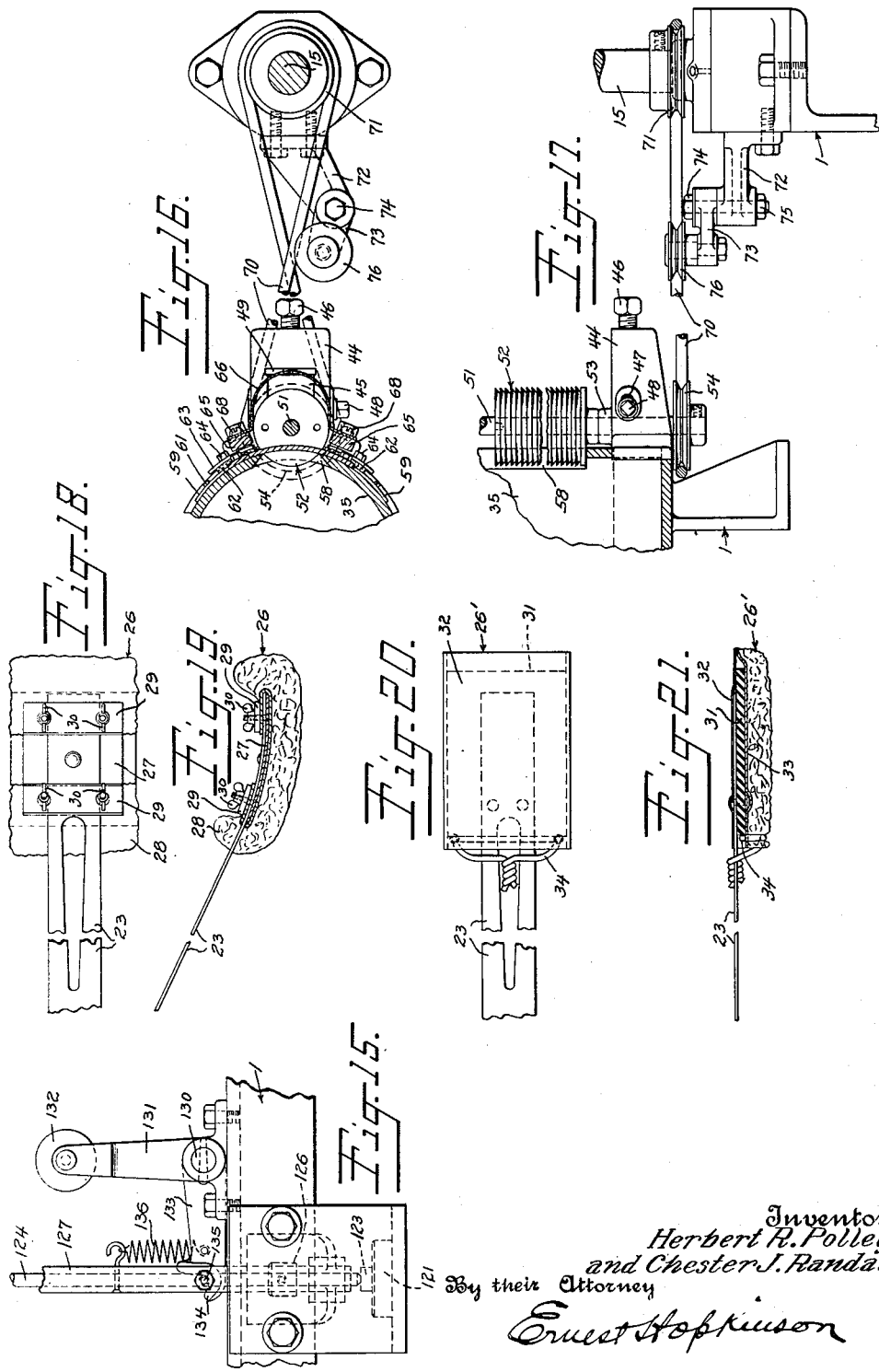
Inventors
Herbert R. Polleys
and Chester J. Randall
By their Attorney
Ernest Hopkinson May 6, 1924.
H. R. POLLEYS ET AL
1,492,745
MACHINE FOR APPLYING FLUENT MATERIAL
Filed Jan. 31, 1921   5 Sheets-Sheet 5
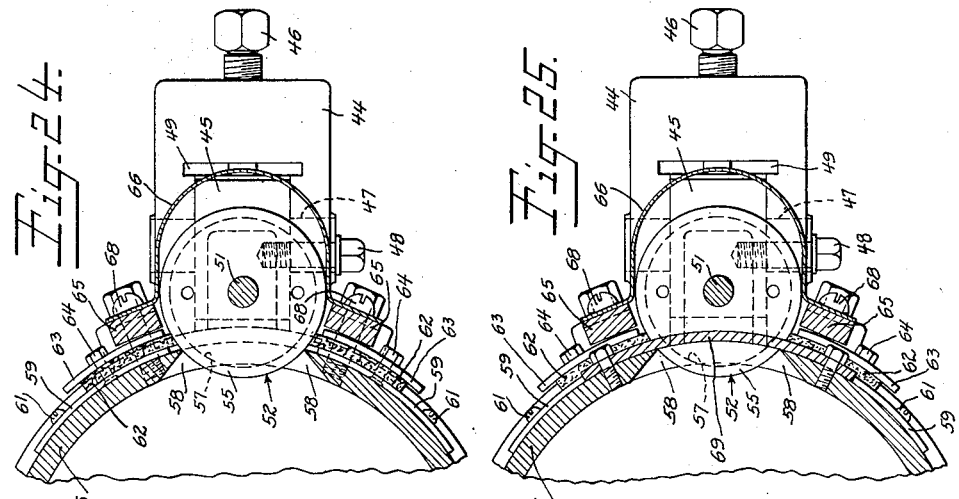
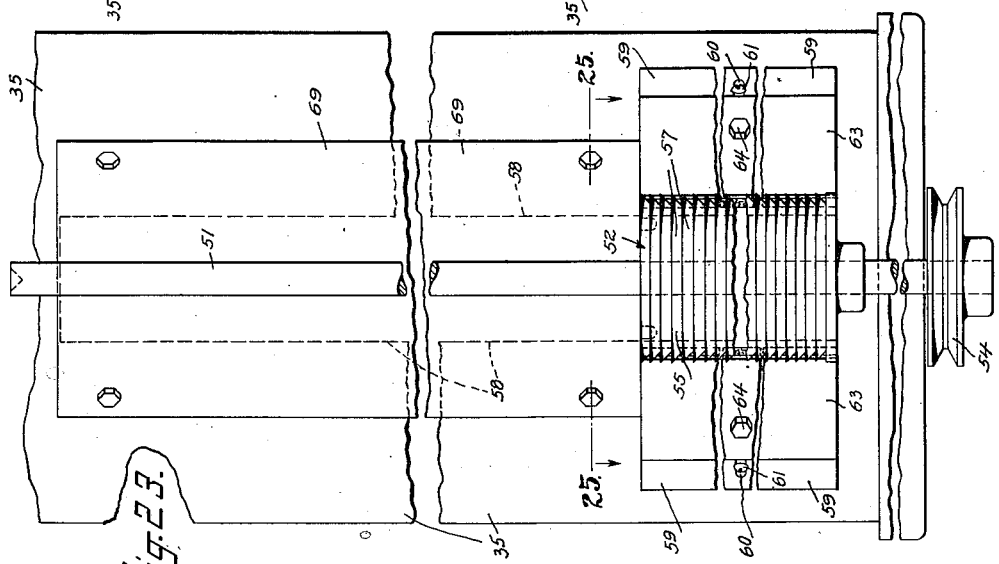
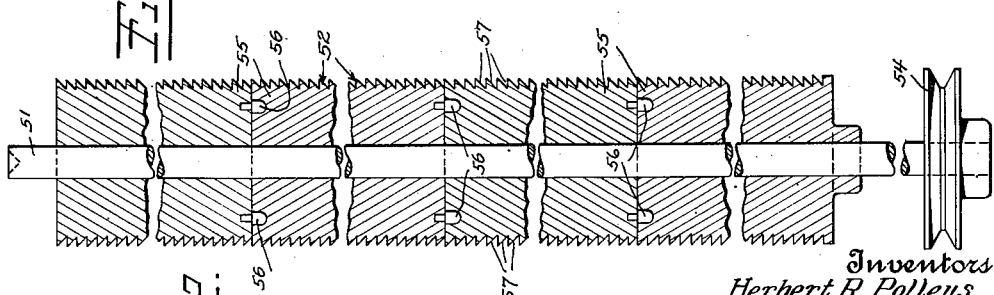
Inventors
Herbert R. Polleys
and Chester J. Randall
By their Attorney
Ernest Hopkinson Patented May 6, 1924.

1,492,745

UNITED STATES PATENT OFFICE.

HERBERT R. POLLEYS, OF NEW HAVEN, AND CHESTER J. RANDALL, OF NAUGATUCK, CONNECTICUT, ASSIGNORS TO THE GOODYEAR'S METALLIC RUBBER SHOE COMPANY, A CORPORATION OF CONNECTICUT.

MACHINE FOR APPLYING FLUENT MATERIAL.

Application filed January 31, 1921. Serial No. 441,212.

*To all whom it may concern:*

Be it known that we, HERBERT R. POLLEYS, a citizen of the United States, residing at New Haven, county of New Haven, and State of Connecticut, and CHESTER J. RANDALL, a citizen of the United States, residing at Naugatuck, county of New Haven, and State of Connecticut, have invented a certain new and useful Machine for Applying Fluent Material, of which the following is a full, clear, and exact description.

This invention relates to a machine for applying fluent material, more particularly to a machine for dusting or powdering and rubbing vulcanizable articles prior to vulcanization in order to produce the so-called "velvet" or dull finish on the articles.

Prior to our invention, in order to produce the velvet or dull finish on vulcanizable articles, such as boots, shoes, etc., they were manually dusted or coated with a fluent material, such as powdered talc or starch, before vulcanization. This operation involves considerable labor, requires a large space, entails a considerable loss of the powdered material used, and as the atmosphere in the vicinity of the operators becomes heavily charged with the powdered material, their health is menaced.

An object of our invention is to provide an improved means for coating articles with fluent material.

Another object is to provide a unitary machine for coating articles of various sizes and shapes.

Still another object is to provide an efficient and simple means for transferring the coating material from its receptacle to the coating means.

A further object is to reduce the labor and time required in dusting or powdering vulcanizable articles prior to vulcanization.

A still further object is to avoid the menace to the health of operators caused by manual dusting or powdering of the articles.

A still further object is to provide an automatic stop for the machine operative upon failure to remove a coated article therefrom.

A still further object is to provide a mounting for the individual brushing elements such that they may yieldingly follow any irregularities in the surface of the article to be coated.

Other objects will appear hereinafter.

For a full and complete disclosure of the invention reference is had to the accompanying specification and drawings in which latter:

Fig. 1 is a top plan of the machine;
Fig. 2 is a side elevation with parts broken away;
Fig. 3 is an elevation of the discharge end of a machine;
Fig. 4 is a diagrammatic view illustrating the operation of the machine;
Fig. 5 is a detail plan partly broken away and in section illustrating the construction of a coating unit;
Fig. 6 is a detail elevation partly broken away and in section of a coating unit;
Fig. 7 is a part elevation and vertical section of the receptacle for the coating material, showing the transfer mechanism for the coating material, parts being omitted for clearness.
Fig. 8 is a partial plan view and partial horizontal section of the receptacle at the upper end of the transfer mechanism;
Fig. 9 is a side elevation partly broken away of a carrier for the article to be coated;
Fig. 10 is an elevation of an adapter for supporting different articles on the carrier;
Fig. 11 is a transverse section through the front end of the carrier;
Fig. 12 is a detail of one of the closure elements at the inlet end of the coating chamber;
Fig. 13 is a similar view of a closure element at the exit end of the coating chamber;
Fig. 14 is a detail elevation of the manual and automatic stop mechanism for the conveyor;
Fig. 15 is a plan partly broken away of the stop mechanism;
Fig. 16 is a detail plan of the drive for the transfer mechanism;
Fig. 17 is a side elevation of the drive;
Fig. 18 is a plan of one form of coating element;
Fig. 19 is a longitudinal section thereof;
Fig. 20 is a plan of a modified form of coating element;
Fig. 21 is a longitudinal section thereof;
Fig. 22 is a vertical section of a transfer roll for the coating material;
Fig. 23 is a broken side elevation, with parts omitted, of a receptacle for the coating material and one of its transfer rolls;

Fig. 24 is an enlarged section on the line 24—24 of Fig. 7; and

Fig. 25 is a section on the line 25—25 of Fig. 23 with the outer brush guard added.

Referring to the drawings the numeral 1 designates the framework in general of the machine, upon the middle portion of which a coating chamber 2 is mounted. In the present instance the machine is driven by an electric motor 3 mounted on the top of the coating chamber, the shaft 4 of which, by means of the worm drive 5 actuates a cross shaft 6, the latter in turn by means of the meshing gears 7 and 8 driving the main shaft 9 of the coating mechanism. Secured some distance apart on the shaft 9 are a pair of gears 10, meshing with gears 11 on cross shafts 12, which latter by means of the gears 13 and 14, drive the shafts 15 of two coating units. Also mounted on the shaft 9 are a second pair of gears 16 which by means of the meshing gears 17, drive the cross shafts 12 of a second pair of coating units mounted on the opposite side of shaft 9 from the first pair. As the coating units are alike in all respects a description of one of them will suffice.

Referring to Figs. 2, 5 and 6, the shaft 15 of each coating unit has secured thereon adjacent its upper and lower ends a collar 18, each collar having extending therefrom a series of radial arms 19 connected by a web 20. The shafts 15 are mounted in suitable bearings at the top and bottom of chamber 2. Corresponding upper and lower radial arms 19 are connected by channeled or grooved bars 21, each of said bars having the side walls of its grooved portion cut away or recessed at intervals as shown at 22. A plurality of spring arms 23 are provided, in the present instance flat in form, one end of each of which is disposed in a recessed portion 22 of a bar 21, and the spring arms in each vertical series are held in position by a bar 24 fitting within the channeled portion of the bar 21 and secured thereto by means of the screws 25. Any other suitable form of resilient arm may be used. At the outer end of each spring arm 23 a brushing or coating element 26 is mounted. This brushing element may be of various forms, two of which are illustrated in Figs. 18 to 21. In the form shown in Figs. 18 and 19 a curved plate 27 is riveted or otherwise secured to the end of the spring arm 23, a piece 28 of sheepskin with the wool on, or other suitable brushing material, is folded around the plate 27 and its ends bent under cross bars 29 secured by wing nuts 30 to the plate 27.

In the form shown in Figs. 20 and 21 the brushing element 26ᵃ is formed by securing a piece 31 of a flexible and resilient leather-like compound having the trade name of "Naugasole" to the end of the arm 23, over which piece of "Naugasole" is drawn a bag formed by sewing together or otherwise securing a piece of canvas 32 and a piece of sheepskin 33. The bag is prevented from being withdrawn from its support during operation of the machine by means of a wire loop 34 the ends of which are passed through holes in the sheepskin 33 and then bent upwardly over the edges of the spring arm 23 at the end of the part 31, and twisted together. If desired both walls of the bag shown in Fig. 21 may be made of sheepskin, in which case the machine may be operated in either direction. It is obvious, however, that the invention is not limited to the use of the particular materials described for forming the brushing elements as any other suitable materials may be used, and the form of the brushing element itself varied to suit circumstances. By reference to Fig. 2 it will be seen that adjacent vertical series of brushing elements in each unit are arranged in staggered relation vertically.

Between each pair of brushing units on the same side of shaft 9 a receptacle for the fluent material and means for transferring the material to the brushing elements are provided. Each receptacle comprises a vertically disposed vessel 35 at the upper end of which is provided a hopper 36 for filling the vessel.

Centrally mounted in each vessel is a shaft 37 carrying a spiral agitator 38 to prevent the material in the vessel from settling, said shaft carrying at its upper end a gear 39 meshing with a gear 40 on the cross shaft 41, the latter having a gear 42 meshing with a gear 43 on the main shaft 9.

At opposite sides of each receptacle means are provided for transferring the material from the receptacle to an adjacent brushing and coating unit, and as the transfer mechanisms are identical in all respects but one of them will be described. Each transfer mechanism is carried by a pair of upper and lower bearing brackets 44 attached to the side of the receptacle 35. A bearing block 45 is slidable in each bracket and is moved by an adjusting screw 46 threaded in the bracket and rotatably connected to the block. In order to lock the bearing block in adjusted position a slot 47 is provided in the side of the bracket through which extends a set-screw 48 threaded into the bearing block 45. Clean-out openings 49 are provided in each bracket in order that an accumulation of the powdering material may not prevent movement of its bearing block and this applies more particularly to the lower brackets. Threaded into each upper bearing block 45 is a bearing screw 50, the conical end of which engages a recess in the upper end of a shaft 51 carrying the transfer roll 52, while the lower portion of the shaft 51 extends through a bearing 53 in the lower bearing block and carries a pulley 54 adjacent its end. In the present instance, (Fig. 22), the transfer roll is shown as formed of a plurality of sections 55, the lower one of which is rigidly connected to the shaft 51, while the other sections are loosely mounted on the shaft and are prevented from turning relatively to each other and to the lower fixed section by the dowel pins 56 on each engaging openings in an adjacent section. The roll sections 55 are provided with series of transverse grooves 57, and the transfer roll, as shown most clearly in Figs. 24 and 25, is disposed so that a portion of its periphery passes through an opening 58 in the wall of the receptacle 35 and contacts with the fluent material therein. The roll sections 55 may be grooved or roughened in any other suitable manner or may be left smooth. It is evident that if the roll 52 is adjusted outwardly there will be gaps on each side between it and the adjacent edges of the opening 58. In order to close these gaps a series of curved plates 59 are provided corresponding in length to the roll sections 55, these plates fitting against the outer surface of receptacle 35, as shown in Figs. 7 and 24 and being adjustable to and from the roll by means of slots 60 and set-screws 61. The edge of the plate 59 may be used to close the gap between the roll and the edge of opening 58, but it is preferred to mount a strip 62 of felt, leather or other suitable material on the plate 59 by means of plate 63 and screw 64, the yielding edge of this felt strip 62 thus forming a closure. In addition, by adjusting the plates 59, so that the felt strips bear with greater or less pressure against the grooved roll 52, the amount of the fluent material withdrawn from the receptacle by the roll may be regulated. As the machine is to be used for coating articles of different height, it is desirable when coating smaller articles that the supply of fluent material be cut off from those coating elements 26 which are located above the top of the article, and this may be done in several ways. As shown in Figs. 7, 8, 24 and 25, vertical bars 65 are secured at their ends to the receptacle 35 at each side of the opening 58, said bars being spaced from the receptacle in order to allow movement of the plates 59, and a curved spring plate 66 is removably secured to said bars by the slots 67 and set-screws 68 and covers the upper part of roll 52. By varying the length of this plate any desired portion of roll 52 may be covered. It is evident that those brushes 26 which contact with the plate 66 will be cut off from the fluent material carried by the grooves 57 and thus rendered inoperative. Another means for regulating the height to which fluent material shall be supplied to the brushing elements 26 is shown in Figs. 23 and 25. In this form as many of the roll sections 55 and plates 59 are removed as project above the article to be coated, and that portion of the opening 58 extending above the remaining roll sections 55 is covered by a curved plate 69 screwed to the receptacle 35. Either device for cutting off the supply of fluent material to the brushing elements not in operation may be used separately, but it is preferred to use both of them, as the plate 69 prevents all egress of the fluent material from the receptacle 35 in a plane above the top of the article to be coated, and the plate 66 prevents the idle brushing elements from striking the shaft 51.

The transfer roll 52 may be frictionally driven by the contact of the brushing elements 26 with the roll, but it is preferred to provide a positive drive for the roll, one form of which is shown in Figs. 16 and 17. The driven pulley 54 is connected by a belt 70 with a drive pulley 71 mounted on the shaft 15 of an adjacent coating unit, and in order to maintain the proper tension on said belt during the various adjustments of shaft 51, a bracket 72 is connected to the frame 1 on which is adjustably mounted an arm 73 by means of the bolt 74 and nut 75, said arm carrying an idler pulley 76 adapted to bear against the belt 70. Any other suitable form of drive may be substituted.

In order to pass the articles to be coated between the coating units a conveyor is provided, this conveyor consisting of an endless chain 77 passing through chamber 2 and having article carriers 78 mounted thereon at intervals. At the ends of the machine the conveyor chain passes over sprockets 79 and 80, the sprocket 79 being an idler one and movably mounted in bearing blocks 81 controlled by the adjusting screws 82. The sprocket 80 is mounted on a shaft 83, on which is also loosely mounted a drive sprocket 84 connected by a chain 85 to the sprocket 86 on the cross shaft 6. The sprocket 84 is connected in driving relation to the shaft 83 by the clutch 87 controlled by a clutch lever 88 pivotally mounted at 89, the lower end of the lever 88 being pivotally connected to a rock arm 90 on the rock shaft 91, which latter, by means of the gears 92 and 93, is actuated from the rock shaft 94 carrying the foot pedals 95.

In the present instance, the carriers 78 are shown as adapted to support footwear, such as boots, rubbers, etc., the upper side of the carrier having mounted thereon a post 96 with a tapered end 97 (Fig. 9) adapted to interfit with a corresponding socket in a boot tree. Small footwear articles, such as rubbers, are usually supported through the various manufacturing processes by means of spaced pins engaging sockets in their lasts, and in order that the carrier shown in Fig. 9 may also be used for supporting rubbers and small articles an adapter is provided (Fig. 10), in the form of a cap 98 having a socket fitting over the tapered end of post 96. To prevent movement of the cap on the post the former is provided with a pivoted latch 99, the head 100 of which engages the recess 101 in the post 96, the opposite end of the latch being engaged by a pin 102 yieldingly pressed outward by a spring (not shown). The diameters of the supporting pins and their spacing are varied according to the size of the last, and in order that a single adapter may be used with different sized lasts it is provided with a plurality of spaced threaded sockets 103 of a uniform bore. Hence, by providing a plurality of last supporting pins 104 of different diameters beyond their threaded portions any desired size of pins 104 may be secured to the adapter 98 in any desired spaced relation. For supporting articles other than footwear the adapter will, of course, be changed as required, or an entirely different support may be connected to the carriers 78.

At the front and rear end of each carrier 78 an anti-friction roll is provided, this roll consisting of a shaft 105 mounted in ball bearings 106 and having pinned to its ends the rollers 107. These rollers run on tracks, and as it is necessary that the article be prevented from sidewise or rocking movement during the coating operation, the upper tracks of the conveyor are formed of angle iron rails 108 and 109 secured together as shown in Fig. 11. As it is unnecessary that the empty carriers be held rigidly against rocking movement when inverted on the lower side of the conveyor, tracks formed of a single angle iron rail 110 are provided to guide the carriers during this portion of their travel.

It is desirable that the inlet and exit of the coating chamber be yieldingly closed in order to prevent the escape of the fluent material while at the same time allowing the articles to be coated to readily pass in and out of the chamber. Numerous forms of closure may be used, one of which is illustrated in Figs. 12 and 13. In Fig. 12, which shows the closure structure at the inlet end, a plate 111 is secured to the wall of chamber 2 on each side of the inlet, said plate having brackets 111' adjacent its top and bottom, and secured in these brackets is a hinge pin 112 on which are mounted a series of hinge members 113, each of which has a stop lug 114 adapted to engage the face of plate 111, and the hinge member 113 is urged in an outward direction or one opposite to the direction of movement of the article to be coated by means of a coil spring 115. Each hinge member 113 carries a supporting piece 116 of "Naugasole" or other flexible and resilient material similar to the piece 31, and over the piece 116 is drawn a bag 116' made of sheepskin or other suitable material similar to the bag 32, 33. The bags 116' may be held in place in any desired manner, such as that employed for the bag 32, 33. In Fig. 13 is shown the construction used at the exit end of the coating chamber 2, which construction is identical with that shown in Fig. 12, except that the hinge members 117 are provided with bearing lugs 118 adapted to engage the edges of plates 111 and the coil springs 119 urge the hinge members and closures in an inward direction and opposite to the direction of movement of the article being coated. The supporting pieces 120 also face inwardly, as do the sheepskin surfaces of the bags 120'. By reference to Fig. 3, it will be seen that the edges of the closures formed by the bags are closely adjacent and prevent the exit of any of the fluent material, and an article on entering or leaving the coating chamber 2 will actuate only so many of the closures as is necessary to allow it to enter or leave the chamber. The closures at the exit end also give an additional rubbing effect and act to remove excess material, although the excess may be removed by a compressed air blast instead, if desired.

As the coated articles leave the chamber 2 they are removed from the carriers 78 by an attendant, but in case of failure to perform this operation, through carelessness or otherwise, it is desirable to provide an automatic stop for the machine actuated by the article which has not been removed. Adjacent the end of the conveyor an ordinary two-button switch 121 is mounted, (Figs. 1, 14 and 15), said switch having a starting button 122 and a stopping button 123, the switch being electrically connected with the motor 3 of the machine in the usual manner. A manually operated push-rod 124 coacts with the starting button 122 and is provided with the adjustable stops 125 and 126 to limit the extent of its movement. In a similar manner the push rod 127 coacts with the stopping button 123 and its movements are limited by the adjustable stops 128 and 129. The following mechanism is provided for automatically actuating the push-rod 127 upon failure of the attendant to remove a coated article from the conveyor. A vertical rock shaft 130 is mounted adjacent the push-rods and carries at its upper end a rock arm 131 in the end of which is mounted a small roller 132 normally disposed in the path of a coated article, should the attendant fail to remove the latter. At the lower end of the rock shaft 130 is a second rock arm 133 having a recessed or hooked end 134 adapted to contact with a pin 135 projecting downwardly from the push rod 127. The arm 133 is yieldingly held in contact with the pin 135 by means of the coil spring 136, one end of which is connected to the arm 133 and the other to the push-rod 127. A second coil spring 137 is connected at one end to the frame 1 and at the other end to the push-rod 127, and acts to return the push-rod 127 to inoperative position, this latter spring being weaker than the spring 136.

At the sides of the coating chamber 2 sliding doors 138 and 139 are provided to allow access to the interior of the chamber for inspection, repairs, or for cleaning out the starch or other fluent material which may have collected in the bottom of the chamber. If desired, any usual form of conveyor may be installed for returning to the receptacles 35 the waste starch or other fluent material collecting in the bottom of the chamber.

In operation, after starting the machine, the attendant places the boots 140 or other articles to be coated on the carriers 78 at the left hand side of the machine, and as each boot engages the closures at the inlet end of the coating chamber 2, it moves inwardly as many of the closures as are necessary to allow it to enter, which closures, by reason of the springs 115, immediately assume the closed position again after the boot has passed. The boot then passes between the first pair of opposed coating units and in contact with their brushing elements 26, which it will be seen by an inspection of Fig. 4, rotates in a direction opposed to the direction taken by the boot, and the boot then passes between the second pair of opposed coating units which are arranged to rotate in the same direction as that taken by the boot. By suitably changing the gearing the pairs of opposed coating units may be caused to rotate at the same or different speeds, but in the case of footwear it is ordinarily preferable to rotate the pair nearest the exit at a higher speed, as this pair are rotating in the same direction as the conveyor is moving while the other pair are rotating in an opposite direction. It is obvious that the number of opposed pairs of coating units may be increased if desired. Due to the yielding mounting of the brushing elements 26 they can be laterally displaced as they contact with the boot or other article and at the same time they can twist on their supports in order to follow any irregularities in the surface of the boot. In addition the thick wool of the sheepskin will conform to irregularities to a considerable extent, particularly in the form shown in Figs. 20 and 21, in which the flexible support 31 is used. As the brushing or coating elements 26 pass across the surface of the grooved rolls 52 they take up the starch or other fluent material in the grooves of the rolls, and as the rolls rotate, their grooved portions again enter the receptacles 35 and take up a fresh supply of the coating material. By adjustment of the felt-edged plates 59 to bear with greater or less pressure on the grooved rolls 52 the quantity of fluent material carried out to the brushing elements by the grooves 57 may be varied. By adjustment of the rolls 52 in and out of openings 58 the peripheral arc of the roll in contact with the material in receptacle 35 may be varied in length. By varying the length of the curved spring plate 66 those brushing elements 26 which are above the plane of the article being coated are prevented from contacting with the roll 52 and taking up the coating material therefrom. Or, as before stated, those roll sections 55 and plates 59 above the plane of the article being coated may be removed and a plate 69 substituted, thereby entirely preventing egress of fluent material from the receptacle 35, except at the points where the brushes are operative to coat the article. The article after passing between the opposed pairs of coating units then passes through the closures at the exit end of the chamber 2 and is removed from its carrier by the attendant. However, if through carelessness or otherwise, he should fail to remove the article before it reaches the roller 132, contact with the roller causes the rock arm 131 to be moved, together with the rock shaft 130 and arm 133, which latter by reason of its yielding connection with the push-rod 127, causes the push-rod to press in the stopping button 123. It will be seen that, due to the yielding connection 136, the boot or other article can continue to move after the push-rod 127 has been actuated until the machine stops, and after the article has passed the roller 132, the yielding connection 136 again brings the arm 133 into contact with pin 135, and the spring 137 withdraws the push-rod 127 from the stopping button 123.

In certain circumstances it may be desirable to pass articles through the coating chamber in either direction, and by merely using suitable closures for the coating chamber and double surfaced brushing elements this may readily be accomplished.

It is apparent that numerous changes may be made in the machine without departing from the spirit of the invention, and it is not limited in its use to the powdering and rubbing of footwear or other articles to obtain the so-called "velvet finish," but it may be used for brushing vulcanizable articles, such as hot water bottles, etc., to prevent adhesion, and in general, it may be used wherever it is desired to coat articles, particularly those of irregular shape, with fluent material.

Having thus described our invention, what we claim and desire to protect by Letters Patent is:

1. In a machine for applying fluent material to articles, series of rotatable material applying devices, the devices in one series rotating oppositely to the corresponding devices in a succeeding series, means for successively subjecting each article to the action of different series, and means for supplying the material to said devices.

2. In combination, a conveyor for articles to be coated, and means disposed adjacent said conveyor for simultaneously coating each article from opposite sides and successively in opposite directions.

3. In combination, a conveyor for articles to be coated, a plurality of rotatable shafts between which the conveyor passes, resilient supports carried by said shafts, and flexible coating means carried by the supports for collectively coating each article with fluent material irrespective of its contour.

4. In combination, a conveyor for articles of irregular shape, and resilient coating means coacting therewith and deformable in all directions by the articles for uniformly coating each article with fluent material irrespective of the contour thereof.

5. In a machine for applying fluent material to articles, series of oppositely rotated resiliently mounted material applying devices, means for successively subjecting each article to the action of a different series, and means for uniformly supplying the material to said devices.

6. In a machine for applying fluent material to articles, pairs of transversely aligned material applying means, each of said means comprising radially arranged and resiliently mounted article contacting devices, means for rotating said material applying means, means for supplying the fluent material to said contacting devices, and means for conveying the articles into contact with said devices.

7. In a machine for coating articles with fluent material, a receptacle for the material, rotatable means for applying the material to the article, and grooved rotatable means adapted to contact with said first means for transferring the material from the receptacle to said first means.

8. In a machine for applying fluent material to articles, a plurality of receptacles for the material, rotatable grooved rolls adapted to be disposed with their peripheries partly within the walls of said receptacles, series of resiliently supported and rotatably mounted brushing devices adapted to coact with said rolls, and means for presenting the articles to said brushing devices.

9. In a machine for coating articles with fluent material, a receptacle for the material, a plurality of oppositely rotatable coating means for engaging the article at different points, and means actuated from said coating means for transferring material from the receptacle to the coating means.

10. In a machine for coating articles with fluent material, a receptacle for the material having an opening in its wall, a grooved roll mounted in bearings adjacent said receptacle and adjustable in said opening, means for applying the material movable across the face of said roll, and means for moving the article into the path of said means.

11. In a machine for coating articles with fluent material, a receptacle for the material having an opening in its wall, a grooved roll mounted in bearings adjacent said receptacle and adjustable in said opening, adjustable means for limiting the quantity of material withdrawn by the roll, means for applying the material to the article movable across the face of said roll, and means for moving the article into the path of said last means.

12. In a machine for coating articles with fluent material, a receptacle for the material, means for applying the material, contact means for transferring material from the receptacle to said first means, and means for varying in a plurality of dimensions the surface of said contact means in contact with the material.

13. In a machine for coating articles with fluent material, a receptacle for the material, rotatable material transferring means adapted to be disposed with its periphery in contact with the material in the receptacle, means for varying the arc of such periphery in contact with the material, and means for applying the material to the article to be coated and adapted to receive material from said rotatable transferring means.

14. In a machine for coating articles with fluent material, a receptacle for the material, rotatable material transferring means adapted to be disposed with its periphery in contact with the material in the receptacle, means for limiting the longitudinal extent of such means in contact with the material, and means for applying the material to the article to be coated and adapted to receive material from said rotatable transferring means.

15. In a machine for coating articles with fluent material, a receptacle for the material having an opening in its wall, a grooved roll mounted in bearings adjacent said receptacle and adjustable in said opening, means for varying the longitudinal extent of the roll exposed to the material, means for varying the quantity of material withdrawn by the exposed surface of the roll. means for applying the material to the article movable across the face of said roll, and means for moving the article into the path of said last means.

16. In a machine for coating articles with fluent material, a receptacle for the material, means for agitating the material therein, means adapted to contact with the material for transferring it from the receptacle, a plurality of means for varying the area of said last means in contact with the material, means for removing excess material from the transferring means, and coating means for the article and adapted to receive material from said transferring means.

17. In a machine for coating articles with fluent material, a receptacle for the material, rotatable material transferring means disposed with its periphery adapted to contact with the material, means for limiting the transverse and longitudinal extent of such periphery in contact with the material, and means for applying the material to the article to be coated and adapted to receive material from said rotatable transferring means.

18. In a machine for coating articles with fluent material, a receptacle for the material, brushing devices supplied therefrom and adapted to coat articles of different heights, means for conveying articles into operative relation to said brushing devices, and means for cutting off the supply of material from any brushing devices disposed out of operative relation to the article being coated.

19. In a coating machine, a plurality of coating elements, each comprising a flexible means for retaining and applying fluent material to an article to be coated, supporting means for each element capable of flexure on the axis thereof and also across said axis, means for supplying fluent material to each element, and means for bringing the article and coating elements into contact.

20. In a coating machine, a receptacle for fluent material, a plurality of coating elements supplied therefrom, each comprising a resilient support, a flexible backing carried thereby and a flexible covering adapted to retain fluent material disposed on said backing, and means for bringing the article and coating elements into contact.

21. In a coating machine, means for applying fluent material, a conveyor for bringing an article to be coated into operative relation to said means, a carrier for an article on said conveyor, a support on said carrier for the article, and an adapter for supporting different articles interfitting with said support.

22. In a coating machine, a receptacle for fluent material having an opening in its wall, a transfer roll adjustably mounted in said opening and adapted to contact with said material, adjustable closures at the sides of said opening in contact with the periphery of said roll, and coating means adapted to contact with said roll and with an article to be coated.

23. In a coating machine, a receptacle for fluent material having an opening in its wall, a grooved transfer roll adjustably mounted in said opening and adapted to contact with said material, adjustable closures at the sides of said opening, yielding material secured to said closures and adapted to contact with the periphery of said roll, and movable coating means alternately contacting with said roll and an article to be coated.

24. In a coating machine, a receptacle for fluent material having an extended opening in its wall, a transfer roll disposed in said opening with its periphery in contact with said material, said roll being composed of removably mounted sections, means for varying the effective length of said opening in accordance with the length of said roll, a series of coating elements adapted to contact with said roll, and means for bringing an article to be coated into contact with said elements.

25. In a coating machine, a fluent material transfer roll and a rotatable coating device mounted on parallel axes, said device comprising a series of resiliently mounted coating elements adapted to contact with said roll, means for supplying fluent material to said roll, means for cutting off certain of said elements from said roll, and means for bringing an article to be coated into contact with said elements.

26. In a coating machine, a coating chamber, means therein for applying fluent material to an article to be coated, means for conveying the article into and out of the chamber, closures at the inlet and exit of the chamber, each closure being divided transversely and longitudinally into a plurality of independently movable sections, and means for resiliently holding each section in closed position.

27. In a machine for coating articles with fluent material, means for conveying the articles through the machine, means for coating said articles, means for manually starting or stopping the machine, means for automatically actuating said stopping means to stop the machine upon failure to remove a coated article therefrom, and a yielding connection between said actuating means and the starting and stopping means.

Signed at Naugatuck, Connecticut, this 25th day of January, 1921.

HERBERT R. POLLEYS.

Signed at Naugatuck, Connecticut, this 25th day of January, 1921.

CHESTER J. RANDALL.